Oct. 13, 1953    F. J. YOUNG    2,655,003
POWER PLANT FOR DRILLING RIGS
Original Filed Dec. 3, 1945
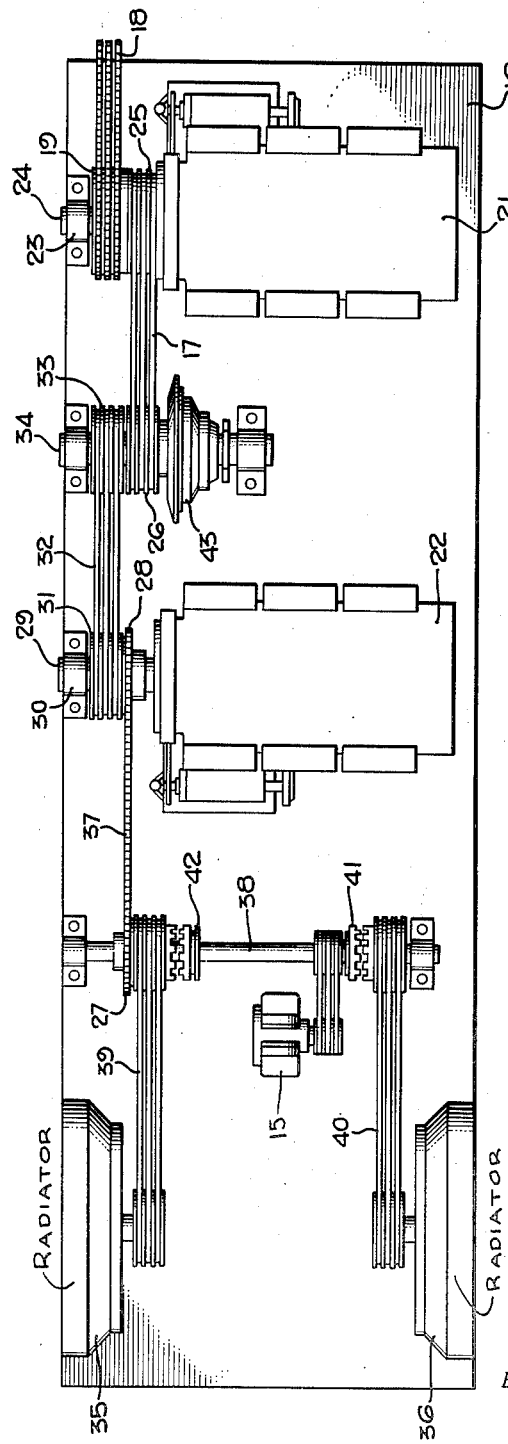
FORREST J. YOUNG,
INVENTOR.
BY
ATTORNEYS Patented Oct. 13, 1953

2,655,003

UNITED STATES PATENT OFFICE 2,655,003

POWER PLANT FOR DRILLING RIGS

Forrest J. Young, Los Angeles, Calif., assignor to The National Supply Company, Pittsburgh, Pa., a corporation of Pennsylvania Original application December 3, 1945, Serial No. 632,342, now Patent No. 2,602,635, dated July 8, 1952. Divided and this application July 1, 1950, Serial No. 171,617

5 Claims. (Cl. 60—97)

This invention relates to a power plant for a drilling rig for the drilling of wells, and is a division of my copending application for "Drilling Rig," Serial No. 632,342, filed December 3, 1945, now Patent No. 2,602,635.

A problem of considerable importance which has faced the industry in the construction, transportation and erection of drilling rigs is brought about by the size of the structures, i. e., the dimensions thereof which have required special equipment and special permits to allow their transportation over highways.

It is therefore an object of this invention to provide a drilling rig which is of the internal combustion engine power type and which incorporates an improved arrangement of sprockets and clutches or transmission elements which will considerably increase the efficiency of this type of drilling rig.

Another object of this invention is to provide a construction of drilling rig which may be of the heavy duty type and which is of unit construction permitting transportation and assembly of the drilling rig in an efficient manner and which is so constructed, and the size of units of which are such, that the same may be transported over highways on existing equipment and without the necessity of obtaining special permits for the use of highways in their transportation.

Another object is to provide a portable power unit having a plurality of engine assemblies positioned transversely thereof in parallel relation, and power compounding clutch means mounted between the prime movers, whereby the power unit may be of minimum width.

Other objects and advantages will appear more fully hereinafter.

The drawing shows a plan view of a preferred embodiment of my invention.

The engines 21 and 22 are mounted in parallel relation transversely of the base frame 16 and are adapted to drive parallel stub-shafts 24 and 29, each provided with an outboard bearing 23 and 30 carried on the base frame 16. Carried by the shaft 24 and fixed thereon is a multiple chain sprocket 19 which functions as a power take-off unit to drive a drawworks and rotary machine (not shown) by way of the multiple strand chain 18. Also fixed on the shaft 24 is a compounding sprocket 25 aligned with sprocket 26 which is rotatably mounted on the clutch shaft 34. A multiple strand chain 17 is trained over sprockets 25 and 26.

The clutch shaft 34 is carried on the base frame 16 between the engines 21 and 22 and is parallel to the shafts 24 and 29. A friction clutch 43 is provided for selectively coupling the sprocket 26 in driving relation with the clutch shaft 34. A sprocket 33 is fixed upon the clutch shaft 34 and is operatively connected by chain 32 to a sprocket 31 fixed on the shaft 29. The reason for the provision of the clutch shaft 34, together with its associated sprockets 26 and 33 and friction clutch 43, and its location between the engines 21 and 22, is to eliminate the need for clutches on the stub-shafts 24 and 29. By this means the overall length of the engine assemblies including the stub-shafts and bearings can be held within the 8-foot limit. It will be observed that the clutch device 43 is located between two vertical planes, the first passing through the forward ends of the engines and the second passing through the rearward ends of the engines. In this way the lateral space required for the clutch device is telescoped into the lateral space required for the two engines, thereby realizing a power unit of minimum width.

It will be understood that the term "dual sprocket member" as used herein means either a single member having two sprockets thereon, or two separate sprockets fixed against relative rotation.

As a further means of reducing the overall length of the engine assemblies, the cooling radiators 35 and 36 for the water cooling circulatory systems of the internal combustion engines 21 and 22 are displaced with reference to the engine locations and are mounted upon the rear of the base frame 16. The fan elements (not shown) of these radiators are driven by belted connections 39 and 40 from pulleys rotatably mounted on the countershaft 38, and provided with individual clutches 41 and 42. The countershaft 38 is rotatably mounted on the base frame 16 and is driven by fixed sprockets 27, 28 and the chain 37. An air compressor unit 15 is driven from the countershaft 38 to provide a supply of air under pressure for operating the pneumatic friction clutches described hereinafter, and for starting the engines 21 and 22, and for other purposes.

Having fully described my invention, it is to be understood that I do not wish to be limited to the details herein set forth, but my invention is of the full scope of the appended claims.

I claim:

1. In a well drilling power plant, the combination of: a longitudinally extending frame, a pair of engine assemblies positioned transversely of the frame in parallel relation, each engine assembly including a dual sprocket member fixed on a power shaft, a clutch shaft parallel to and positioned between said power shafts, a single sprocket member fixed to the clutch shaft, means for rotatably supporting said shafts including an outboard supporting bearing for each of said shafts, each positioned immediately adjacent a side edge of the frame and immediately adjacent one of the said sprocket members, a single sprocket member rotatably mounted on the clutch shaft, a chain connecting each of said single sprocket members in driving relation with one of the sprockets on each dual sprocket member, drive chains extending in opposite directions from each of the other sprockets on each dual sprocket member, and releasable clutch means adjacent the second named single sprocket member for selectively connecting the single sprocket members for rotation as a unit.

2. In a well drilling power plant, the combination of a longitudinally extending frame, a pair of engine assemblies positioned transversely of the frame in parallel relation, each engine assembly including a dual sprocket member fixed on a power shaft, a clutch shaft parallel to and positioned between said power shafts, a single sprocket member fixed to the clutch shaft, means for rotatably supporting said shafts including an outboard supporting bearing for each of said shafts each positioned immediately adjacent a side edge of the frame and immediately adjacent one of the said sprocket members, a single sprocket member rotatably mounted on the clutch shaft, a chain connecting each of said single sprocket members in driving relation with one of the sprockets on each dual sprocket member, the other sprocket on each dual sprocket member being adapted to drive a driven mechanism, and releasable friction clutch means positioned between the engine assemblies and on the same side of said chains for selectively connecting the single sprocket members for rotation as a unit.

3. In a well drilling power plant, the combination of a longitudinally extending frame, a pair of engines positioned transversely of the frame in parallel relation, the power shaft aligned with each engine and driven thereby, a dual sprocket member fixed on one of the power shafts, a pair of single sprockets mounted for independent rotation about an axis parallel to the power shafts and positioned between them, a chain connecting one of the single sprockets in driving relation with one of the sprockets of the dual sprocket member, a second chain engaged with the other sprocket of the dual sprocket member and extending in a direction away from said single sprockets, means including a third chain connecting the other power shaft in driving relation with the other single sprocket, the forward ends of the engines lying in a common vertical plane, the rearward ends of the engines lying in a parallel plane, and releasable clutch means positioned between said planes for selectively connecting the single sprockets for rotation as a unit.

4. In a well drilling power plant, the combination of a longitudinally extending frame, a pair of engines positioned transversely of the frame in parallel relation, a power shaft aligned with each of said engines and driven thereby, a clutch shaft parallel to and positioned between said power shafts, means for supporting said shafts on the frame including an outboard supporting bearing for each of said power shafts, each positioned immediately adjacent a side edge of the frame, said means also including a support for the clutch shaft positioned immediately adjacent a side edge of the frame, first and second sprockets fixed on one of the power shafts, the first sprocket being positioned immediately adjacent said outboard supporting bearing for said power shaft, third and fourth sprockets mounted for independent rotation coaxially of said clutch shaft, the third sprocket being positioned immediately adjacent said support, fifth and sixth sprockets fixed on the other said power shaft, the fifth sprocket being positioned immediately adjacent the outboard supporting bearing for said power shaft, a chain connecting the first and third sprockets, a chain connecting the fourth and sixth sprockets, a chain engaging the second sprocket and extending in a direction away from the clutch shaft, a chain engaging the fifth sprocket and extending in a direction away from the clutch shaft, and releasable clutch means adjacent said fourth sprocket for selectively connecting said third and fourth sprockets for rotation as a unit.

5. In a well drilling power plant, the combination of a longitudinally extending frame, a pair of internal combustion engine assemblies positioned transversely of the frame in parallel relation, and each having a power shaft extending in the same direction, cooling radiators for said engine assemblies mounted on said frame remote from said engine assemblies and provided with air circulating means, a pair of single elements mounted for independent rotation about an axis parallel to the power shafts and positioned between them, power transmission means connecting each of said single elements to one of said power shafts, means whereby one of the power shafts may drive said air circulating means, means whereby the other of the power shafts may drive a driven mechanism, and releasable clutch means positioned on the same side of the power transmission means as the engine assemblies for selectively connecting the single elements for rotation as a unit.

FORREST J. YOUNG.

References Cited in the file of this patent

UNITED STATES PATENTS

| Number | Name | Date |
|---|---|---|
| 1,990,810 | Young | Feb. 12, 1935 |
| 2,488,069 | Spalding | Nov. 15, 1949 |
| 2,541,625 | Webster | Feb. 13, 1951 |